United States Patent
Adcock et al.

(10) Patent No.: US 12,267,372 B2
(45) Date of Patent: Apr. 1, 2025

(54) ENABLING PERMISSIBLE INTERACTIONS WITH APPLICATIONS SHARED DURING AUDIO-VISUAL COMMUNICATION SESSIONS

(71) Applicant: Capital One Services, LLC, McLean, VA (US)

(72) Inventors: Lee Adcock, Midlothian, VA (US); Vamsi Kavuri, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 8 days.

(21) Appl. No.: 18/185,338

(22) Filed: Mar. 16, 2023

(65) Prior Publication Data

US 2024/0314180 A1   Sep. 19, 2024

(51) Int. Cl.
*H04L 65/401* (2022.01)
*H04L 65/403* (2022.01)

(52) U.S. Cl.
CPC ........ *H04L 65/4015* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 11,212,326 | B2* | 12/2021 | Faulkner | H04M 3/568 |
| 11,424,945 | B1* | 8/2022 | Yang | G06F 40/169 |
| 2004/0179036 | A1* | 9/2004 | Teplov | H04L 65/4015 |
| | | | | 715/751 |
| 2013/0066974 | A1* | 3/2013 | Yoakum | H04L 12/1827 |
| | | | | 709/205 |
| 2018/0367484 | A1* | 12/2018 | Rodriguez | H04L 67/75 |
| 2023/0328123 | A1* | 10/2023 | Bonnett-Brooks | H04L 63/10 |
| | | | | 370/498 |

* cited by examiner

*Primary Examiner* — Tonia L Dollinger
*Assistant Examiner* — Jonathan A Sparks
(74) *Attorney, Agent, or Firm* — Foley & Lardner LLP

(57) ABSTRACT

Methods and systems are described herein for enabling permissible interactions with applications shared during communication sessions. The system may detect, by a communication application on a first device during a communication session, activation of a sharing function on a second device. The sharing function may enable sharing of a shared application via the communication application. The system may determine one or more permissible interactions for the first device to perform with one or more portions of the shared application. Based on user input received by the first device, the system may detect an interaction with a portion of the shared application. The system may determine whether the interaction is a permissible interaction for the shared application. In response to determining that the interaction is permissible, the system may perform an action on the portion of the shared application on the first device.

20 Claims, 8 Drawing Sheets

300

| Applications | Portions | Interactions | Permissible? |
|---|---|---|---|
| <app_1> | <portion_1a> | <interaction_1> | YES |
| | | <interaction_4> | NO |
| | <portion_1b> | <interaction_7> | NO |
| | <portion_1c> | <interaction_1> | YES |
| | | <interaction_3> | NO |
| | | <interaction_4> | YES |
| <app_2> | <portion_2a> | <interaction_1> | YES |
| | <portion_2b> | <interaction_2> | NO |
| | <portion_2c> | <interaction_1> | YES |
| | <portion_2d> | <interaction_4> | NO |
| | | <interaction_7> | NO |

303  306  309  312

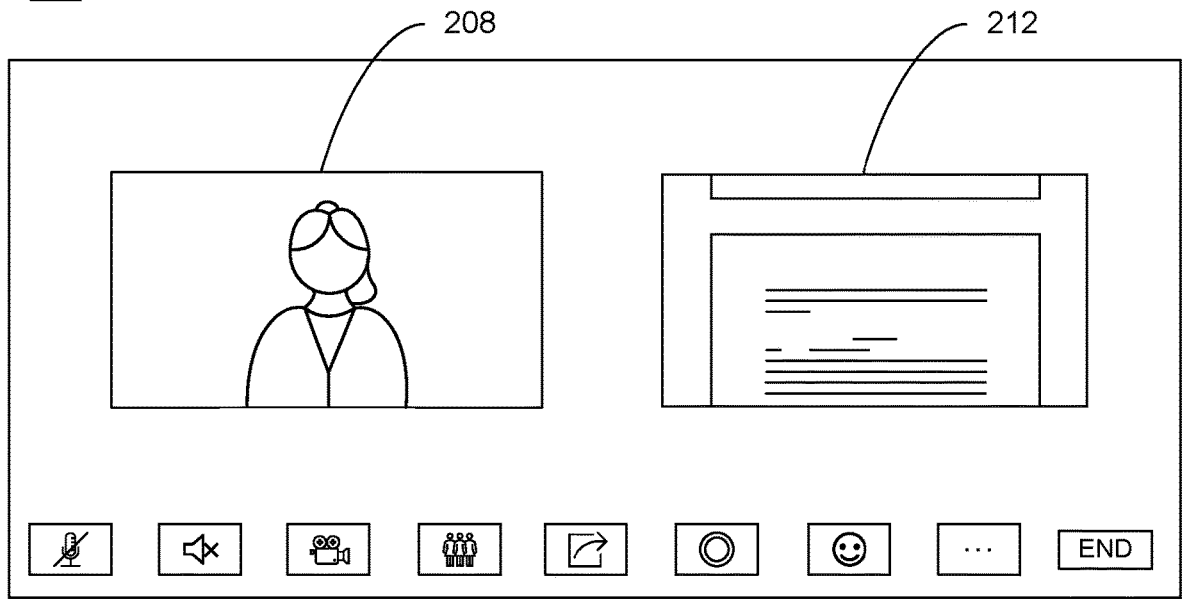
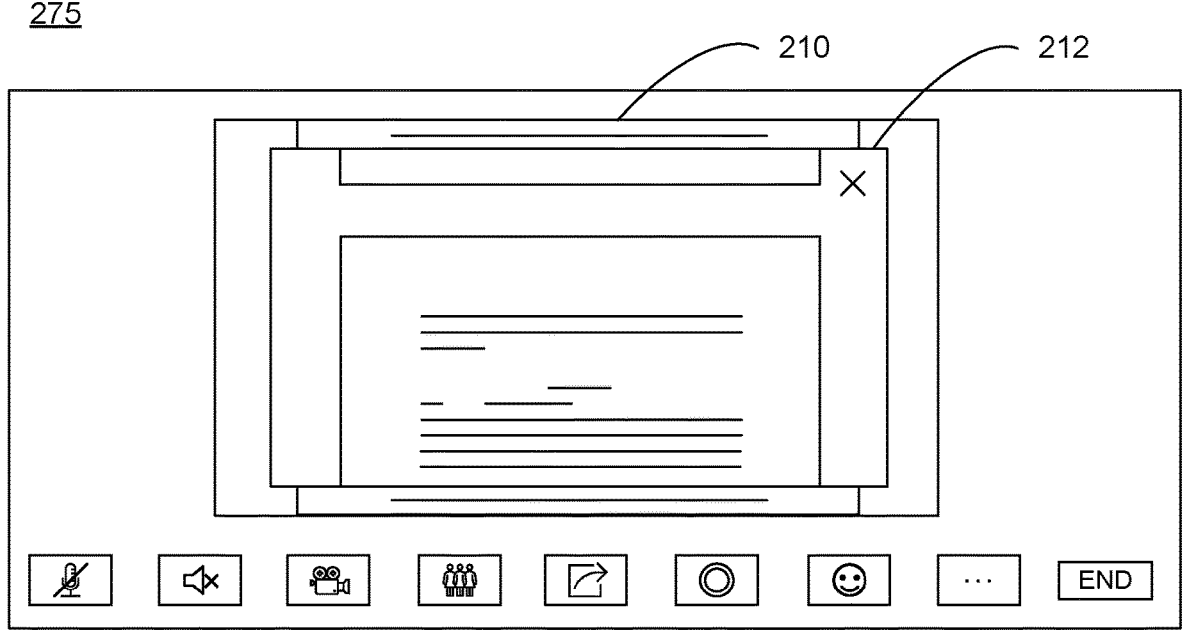
FIG. 2B

300

| Applications | Portions | Interactions | Permissible? |
|---|---|---|---|
| <app_1> | <portion_1a> | <interaction_1> | YES |
| | | <interaction_4> | NO |
| | <portion_1b> | <interaction_7> | NO |
| | <portion_1c> | <interaction_1> | YES |
| | | <interaction_3> | NO |
| | | <interaction_4> | YES |
| <app_2> | <portion_2a> | <interaction_1> | YES |
| | <portion_2b> | <interaction_2> | NO |
| | <portion_2c> | <interaction_1> | YES |
| | <portion_2d> | <interaction_4> | NO |
| | | <interaction_7> | NO |

303 Applications
306 Portions
309 Interactions
312 Permissible?

| Applications | Portions | Interactions |
|---|---|---|
| <shared_app> | <portion_shared_a> | <interaction_1> |
| | | <interaction_3> |
| | <portion_shared_b> | <interaction_4> |
| | <portion_shared_c> | <interaction_1> |
| | | <interaction_4> |

550

| Portion A Interaction 1 Permissible? | Portion A Interaction 3 Permissible? | Portion B Interaction 4 Permissible? | Portion C Interaction 1 Permissible? | Portion C Interaction 4 Permissible? |
|---|---|---|---|---|
| YES | NO | NO | YES | YES |

FIG. 5

ENABLING PERMISSIBLE INTERACTIONS WITH APPLICATIONS SHARED DURING AUDIO-VISUAL COMMUNICATION SESSIONS

BACKGROUND

Audio-visual presentations to groups of people have become ubiquitous in today's world. Presentation enabling applications that generally enable a presenter to share content during the presentation have become more and more adaptable at various presentation functions. For example, the presenter is able to share his or her screen or a particular application so that the viewers or consumers of the presentation are enabled to view content that the presenter wants to highlight. Typically, a viewer of an audio-visual communication session is enabled to view shared applications within the view of a presenter. For example, if a presenter shares a document during an audio-visual communication session, viewers are enabled to view the content of the document being shown by the presenter, without being able to independently scroll around the document. That is, viewers are unable to gain a deeper understanding of the shared application, for example, by interacting with the shared application independently. Initial attempts to solve this problem enable a presenter to relinquish control of the shared application to a viewer, who may then interact directly with the application via the audio-visual communication application. However, the presenter may be unable to regain control of the shared application, or the presenter may be unable to proceed with the audio-visual communication session. In another example, if a presenter is sharing interactive content, the system may be unable to detect which interactions are permissible for a viewer to perform when interacting with the shared application. Thus, a mechanism is desired for enabling permissible interactions with applications shared during audio-visual communication sessions.

SUMMARY

Methods and systems are described herein for enabling permissible interactions with applications shared during audio-visual communication sessions. When a presenter shares an application view (e.g., during an audio-visual conference, conventional systems generally do not allow a viewer or a consumer of the application to interact with the application (e.g., scroll up/down or select interactive elements, etc.). To perform any interaction with a shared application, the viewer needs to be allowed control, which is then taken away from the presenter. Even when the viewer is given control, the interaction is shown on the displays of all the other users and these conventional systems are unable to determine which interactions should be allowed and which should not be allowed. Thus, conventional systems generally do not enable users to perform permissible interactions with shared applications during an audio-visual communication session without affecting displays of other client devices participating in the audio-visual communication session. For example, it is difficult for conventional systems to predict which interactions are permissible for a user to perform with one or more portions of a shared application. Furthermore, conventional systems generally do not perform actions based on those permissible interactions without performing the actions on corresponding portions of other client devices participating in the audio-visual communication session.

To overcome these technical problems, methods and systems disclosed herein determine (e.g., via a machine learning model) permissible interactions for a first device (e.g., a device of a viewer of a presentation) to perform with a shared application (e.g., being shared from a device of a presenter). The system may then perform an action, based on a permissible interaction, on the shared application on the first device. For example, the system may detect, by a communication application on a first device during a communication session between a plurality of users, an activation of a sharing function on a second device. The sharing function may enable sharing a view of a shared application via the communication application. The system may receive, from the second device, parameter data associated with the shared application, and may determine, based on the parameter data, one or more permissible interactions for the first device to perform with one or more portions of the shared application. Based on a user input received by the first device, the system may detect an interaction with a portion of the shared application. The system may then determine whether the interaction is a permissible interaction for the shared application. In response to determining that the interaction is permissible, the system may perform, according to the interaction, an action on the portion of the shared application on the first device.

In some embodiments, the system may detect, using a communication application on a first client device during an audio-visual communication session between a plurality of users, an activation of a sharing function on a second client device. The sharing function may enable sharing a view of a shared application via a communication application. For example, the communication application may be an audio/video conferencing application. The shared application may be another application, such as a web browser, a word processing application, a document viewer, a video player, an audio player, and/or another communication application, or another type of application that is shared. The sharing function may be activated by a user of the second client device. For example, the user of the second client device may be a presenter, viewer, participant, or another suitable user. The sharing function may be activated on the second client device by interacting with an interface of the communication application, selecting the shared application, or selecting another element.

The system may receive, from the second client device, parameter data associated with the shared application. The parameter data may include a type of the shared application and activation instructions for activating the shared application on the first client device. For example, the type of the shared application may specify a web browser, word processing application, document viewer, video player, audio player, another communication application, or another type of application to be shared. The activation instructions may include an identifier of a file to access with the shared application. For example, for a shared web browser, the activation instructions may identify a web page to access. For a shared word processing application, the activation instructions may identify a document to access. For a shared video player, the activation instructions may identify a video file to access, and so on.

Based on the type of the shared application, the system may determine one or more permissible interactions for the first client device to perform with one or more visual portions of the shared application. Certain interactions may be permissible for some shared applications and not permissible for other shared applications. For example, selecting hyperlinks may be permissible in shared browser applications but not permitted in shared word processing applications or document viewing applications. As another example, a user may be able to highlight text in certain shared applications but not in other shared applications.

Upon activation of the shared application according to the activation instructions, the system may detect an interaction with the shared application. For example, the system may detect the interaction based on a user input received by the first client device. The interaction may be a selection of or an adjustment to a visual portion of the one or more visual portions of the shared application. For example, the interaction may include clicking on a button, selecting a hyperlink, entering a text input, scrolling, zooming in or out, highlighting text, clicking and dragging an icon, or performing some other interaction with the shared application.

The system may determine whether the interaction is a permissible interaction of the one or more permissible interactions for the shared application. For example, the system may determine, on the first device, possible interactions with the visual portions of the shared application. The system may utilize a machine learning model to determine which interactions are permissible interactions for the shared application. For example, the system may utilize a trained machine learning model to output permissible interactions for shared applications. The system may generate a dataset including entries for the shared application. The entries may include the possible interactions with the visual portions of the shared application. The system may input, into a machine learning model, the dataset to obtain predictions indicating the one or more permissible interactions for the shared application. In some embodiments, the machine learning model may be trained to indicate whether interactions with portions of applications are permissible. The system may then compare the interaction with the plurality of predictions.

In response to determining that the interaction is permissible, the system may perform, according to the interaction, an action on the visual portion of the shared application on the first client device. For example, if the interaction is a selection of a hyperlink, the corresponding action may include opening the linked page. If the interaction is scrolling or zooming, the corresponding action may be adjusting the display of the shared application accordingly. In some embodiments, the action may not be performed on a corresponding visual portion of the shared application on the second client device. For example, when a viewer scrolls on a document shared by the presenter, the results of the scrolling may only be visible to the viewer and not the presenter or other viewers of the presentation. Furthermore, the action may not be performed on corresponding visual portions of the shared application on the other client devices in the audio-visual communication session. For example, the system may continue to output, to the other client devices, the view of the shared application according to the second client device. The other client devices may independently interact with the shared application, and each client device may therefore output an individualized view of the shared application via the client device display.

In response to performing the action according to a permissible interaction, the system may generate for display an indication of a view, on the second device, of the shared application. For example, the view on the second device of the shared application may be a presenter's view of the shared application. The action may cause an indication of the view on the second device of the shared application to be displayed on the first device. For example, a participant may be able to view the presenter's view of the content, as well as their own view of the content. The indication may be interactive such that a user of the first device can select the indication to cause the view of the shared application to be displayed on the first device. For example, if the user wishes to return to the presenter's view of the shared application, the user may be able to interact with the indication to return to the presenter's view.

In response to determining, based on authentication information associated with the shared application on the first client device, that the interaction is not permissible, the system may decline to perform the action on the portion of the shared application on the first client device. For example, the display may not adjust according to the impermissible interaction. In some embodiments, the system may output, via the communication application on the first device, a message indicating a reason for impermissibility of the interaction. For example, reasons may include that a user of the first client device lacks required authentication credentials, that a user of the second client device disabled the particular interaction, or that the interaction is impermissible for some other reason. In some embodiments, the system may output a message indicating permissible interactions for the shared application.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 2A and 2B show illustrative displays of an audio-visual communication session, in accordance with one or more embodiments.

FIG. 3 illustrates a table that may store training data for training a machine learning model, in accordance with one or more embodiments.

FIG. 5 illustrates a data structure for input into a machine learning model and a data structure representing permissibility predictions, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
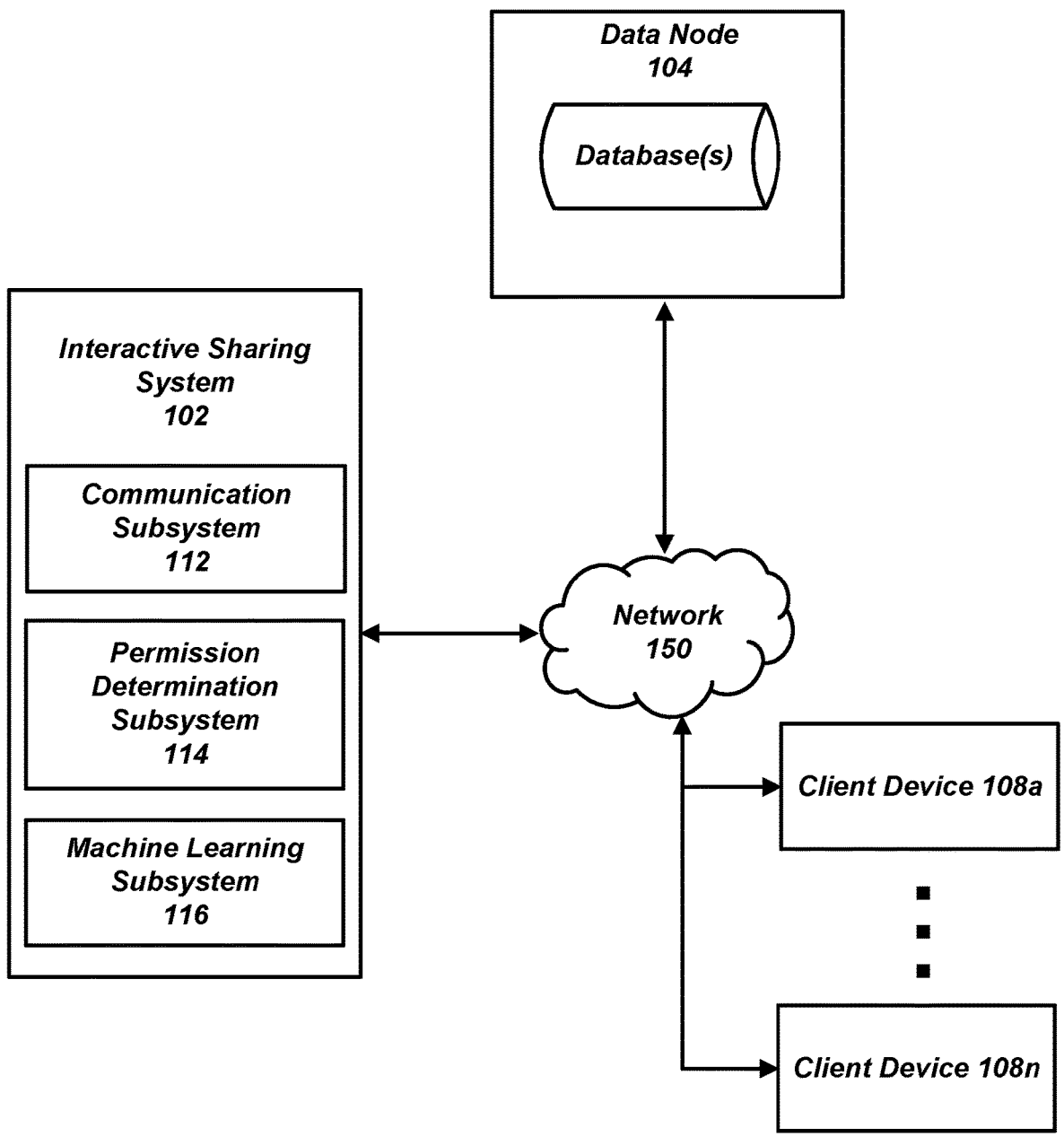
FIG. 1 shows an illustrative system for enabling permissible interactions with applications shared during audio-visual communication sessions, in accordance with one or more embodiments.

FIG. 1 shows an illustrative system 100 for enabling permissible interactions with applications shared during audio-visual communication sessions, in accordance with one or more embodiments. System 100 may include interactive sharing system 102, data node 104, and user devices 108a-108n. Interactive sharing system 102 may include communication subsystem 112, permission determination subsystem 114, machine learning subsystem 116, and/or other subsystems. In some embodiments, only one client device may be used while in other embodiments multiple client devices may be used. The client devices 108a-108n may be associated with one or more users. The client devices 108a-108n may be associated with one or more user accounts. In some embodiments, client devices 108a-108n may be computing devices that may receive and send data via network 150. Client devices 108a-108n may be end-user computing devices (e.g., desktop computers, laptops, electronic tablets, smartphones, and/or other computing devices used by end users). Client devices 108a-108n may output (e.g., via a graphical user interface) run applications, output communications, receive interactions, or perform other actions. In some embodiments, client devices 108a-108n may participate in audio-visual communication sessions with each other via communication applications.

Interactive sharing system 102 may execute instructions for enabling permissible interactions with applications shared during audio-visual communication sessions. Interactive sharing system 102 may include software, hardware, or a combination of the two. For example, communication subsystem 112 may include a network card (e.g., a wireless network card and/or a wired network card) that is associated with software to drive the card. In some embodiments, interactive sharing system 102 may be a physical server or a virtual server that is running on a physical computer system. In some embodiments, interactive sharing system 102 may be configured on a client device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, interactive sharing system 102 and data node 104 may reside on the same hardware and/or the same virtual server/computing device. Network 150 may be a local area network, a wide area network (e.g., the Internet), or a combination of the two.

Interactive sharing system 102 (e.g., communication subsystem 112) may enable client devices (e.g., a first and second client device of client devices 108a-108n) to join an audio-visual communication session between a plurality of users. The audio-visual communication session may be a session in which multiple devices share audio or video with each other simultaneously. For example, the audio-visual communication session may run on a communication application. The communication application may enable the users to share audio, video, livestream data, and shared applications. In some embodiments, one or more users of devices participating in the audio-visual communication session may be presenters (e.g., including the second client device) while other users (e.g., including the first client device) may be participants or viewers. Presenters may be enabled to share content in the form of shared applications for viewing by the participants. In some embodiments, any participant may be enabled to share a shared application with other participants. In some embodiments, participants may be enabled to interact with the shared applications, using permissible interactions, independently from the presenter. Each participant's permissible interactions with the shared application may affect their view of the shared application without affecting the presenter's view of the shared application or other participants' views of the shared application.

Figure 2A:
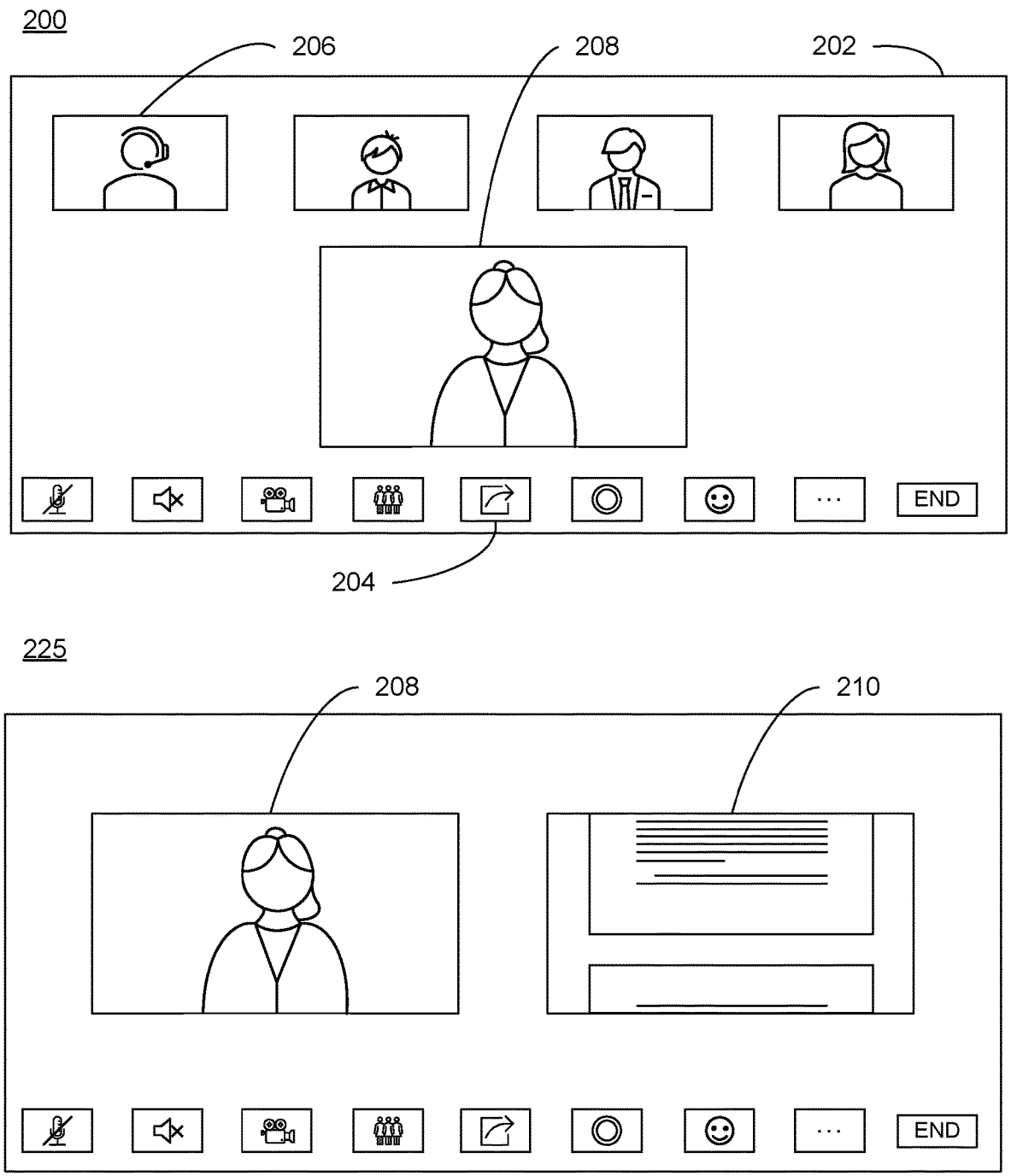

FIG. 2A shows illustrative displays 200 and 225 of an audio-visual communication session, in accordance with one or more embodiments. For example, display 200 may show the audio-visual communication session running on a communication application 202. Communication application 202 may transmit audio and images or video of each user participating in the audio-visual communication session. For example, communication subsystem 112 may receive audio and images or video from each device associated with each user and may transmit the audio and video to each other device participating in the audio-visual communication session. Display 200 may include images or video of each participant 206. Display 200 may additionally include images of video of a presenter 208 or multiple presenters. In some embodiments, presenter 208 may be a user who initiated the audio-visual communication session, generated an invitation for the audio-visual communication session, hosted the audio-visual communication session, or received a presenter status from another user. In some embodiments, an audio-visual communication session may not include any presenters. In some embodiments, an audio-visual communication session may include one or more speakers. In some embodiments, any participant may become a speaker for a given time period by transmitting audio via communication application 202.

Communication subsystem 112 may detect, by a communication application on a first client device during an audio-visual communication session between a plurality of users, an activation of a sharing function on a second client device. The sharing function may enable sharing a view of a shared application via communication application 202. The sharing function may be activated by a presenter (e.g., presenter 208). The sharing function may be activated on the device of presenter 208 by the user (e.g., presenter 208) interacting with the interface of communication application 202, selecting a shared application, or selecting another input. For example, display 200 may include a button 204 for activating the sharing function. A user (e.g., presenter 208) may select button 204 to activate the shared function via communication application 202.

In some embodiments, the shared application may include another application different from the shared application. For example, the shared application may be a browser, word processing application, document viewer, video player, audio player, another communication application, or another type of application that a presenter wishes to share. A user (e.g., presenter 208) may select a shared application after selecting button 204 to activate the sharing function. For example, communication subsystem 112 (e.g., via communication application 202) may prompt the user (e.g., presenter 208) to select a shared application. The user (e.g., presenter 208) may select the shared application from other applications currently running on the presenter's device, select the shared application from a file on the presenter's device, select the shared application from a list of applications available for sharing, or otherwise indicate the shared application. As shown in display 225, communication subsystem 112 (e.g., via communication application 202) may output a presenter view 210 of a shared application. In some embodiments, communication subsystem 112 (e.g., via communication application 202) may adjust the display based on the activation of the sharing function. For example, communication application 202 may move, resize, or remove a view of participants 206, move, resize, or remove, a view of presenter 208, or otherwise adjust the display. In some embodiments, the display may be adjustable by users. For example, a user (e.g., presenter 208) may specify, using various settings or other inputs, how to display presenter view 210 of the shared application. In some embodiments, another user (e.g., one or more of participants 206) may adjust the display of participants 206, presenter 208, presenter view 210 of the shared application, or other features of display 225.

FIG. 2B shows an illustrative display 250 and 275 of an audio-visual communication session, in accordance with one or more embodiments. In some embodiments, display 250 may include presenter 208 as well as a participant view 212 of the shared application. For example, participant view 212 may differ from presenter view 210 in that a participant has adjusted participant view 212 using one or more permissible interactions. For example, depending on the shared application, the participant may be enabled to scroll, zoom, highlight, edit, or otherwise adjust participant view 212. In some embodiments, communication subsystem 112 (e.g., via communication application 202) may show presenter view 210 and participant view 212 side-by-side. In some embodiments, communication subsystem 112 (e.g., via communication application 202) may indicate presenter view 210 within participant view 212 by highlighting, outlining, or otherwise indicating a portion of the shared application which presenter 208 is currently viewing. In some embodiments, display 250 may include a button, link, or other interactive visual portion with which a participant can interact to return to the presenter view 210 of the shared application.

In some embodiments, as shown in display 275, communication subsystem 112 (e.g., via communication application 202) may overlay participant view 212 on top of presenter view 210. For example, when a participant interacts with the shared application in a way that alters a view of the shared application, communication subsystem 112 (e.g., via communication application 202) may generate an overlayed window. The overlay of participant view 212 may enable the participant to easily close out of participant view 212 as desired and return to presenter view 210 of the shared application. For example, the participant may select a button to close out of participant view 212. In some embodiments, communication subsystem 112 may utilize other functionality to display presenter view 210 and participant view 212. In some embodiments, communication subsystem 112 (e.g., via communication application 202) may enable a presenter (e.g., presenter 208) to specify display settings for displaying presenter view 210, participant view 212, and functionality for switching between participant view 212 and presenter view 210.

Returning to FIG. 1, communication subsystem 112 may receive, from the second client device, parameter data associated with the shared application. The parameter data may include a type of the shared application and activation instructions for activating the shared application on the first client device. For example, the type of the shared application may indicate an identifier of the shared application, a category of the shared application, or other information. Based on the type of the shared application, communication subsystem 112 may retrieve (e.g., from data node 104) functionality associated with the type of the shared application. For example, communication subsystem 112 may retrieve possible interactions associated with the shared application. For example, the possible interactions may include scrolling, zooming, highlighting, clicking, right-clicking, reloading, and other possible interactions. In some embodiments, communication subsystem 112 may retrieve interactive visual portions associated with the type of the shared application. For example, the interactive visual portions may be visual portions of the shared application with which a user may interact. Interactive visual portions may include icons, buttons, search bars, drag-and-drop features, progress bars, menus, editing tools, and other interactive visual portions.

In some embodiments, communication subsystem 112 may detect one or more features of the parameter data. For example, if a presenter activates the sharing function for an unknown type of shared application, communication subsystem 112 may attempt to detect the type of shared application. Communication subsystem 112 may identify a category of shared applications with which the shared application is most similar based on, for example, visual elements of the shared application (e.g., text placement, icons, etc.), functionality of the shared application, or other elements.

In addition to information relating to the type of the shared application, the parameter data may include activation instructions. The activation instructions may include steps, guidelines, or other instructions for activating the shared application via the communication application. For example, the activation instructions may include identification information (e.g., hyperlink, URL, file name, network requests, etc.), information on how to embed the shared application in the communication application, and other activation instructions. For example, the activation instructions may include an identifier of a file to access with the shared application. The activation instructions may further instruct communication subsystem 112 how to embed the file in the communication application. For example, communication subsystem 112 may embed the file in the communication application by superimposing an embedded version of the shared application over a portion of the display of the communication application. Communication subsystem 112 may transmit the communication application with the superimposed file to other devices participating in an audio-visual communication session. In some embodiments, communication subsystem 112 may superimpose the file such that it matches a view of a presenter when communication subsystem 112 initially transmits the superimposed file. For example, as shown in display 225 of FIG. 2A, communication subsystem 112 may superimpose presenter view 210 of the shared application over a portion of display 225 of communication application 202 and transmit the superimposed file to one or more participants 206. In some embodiments, the activation instructions may include other instructions for activating the shared application via the communication application.

Interactive sharing system 102 (e.g., permission determination subsystem 114) may determine, based on the type of the shared application, one or more permissible interactions for the shared application on the first client device to perform with one or more visual portions of the shared application. For example, communication subsystem 112 may retrieve (e.g., from data node 104) a subset of the possible interactions which are permissible for the shared application. In some embodiments, communication subsystem 112 may retrieve (e.g., from data node 104) a subset of the possible interactions which are impermissible for the shared application.

In some embodiments, the permissible interactions may be determined based on input from a user. For example, a user associated with a second client device (e.g., a presenter) may determine which interactions are permissible for a user associated with a first client device (e.g., a participant) to perform with the shared application. In some embodiments, the presenter may input permissible interactions via a settings function of the communication application, a settings function of the shared application, or another settings function. In some embodiments, the presenter may input permissible interactions by performing permissible interactions with the shared application before or during the audio-visual communication session. In some embodiments, the presenter may input impermissible interactions with the shared application (e.g., via a settings function or by performing impermissible interactions with the shared application before or during the audio-visual communication session). In some embodiments, the presenter may input permissible or impermissible interactions using another method. In some embodiments, another user (e.g., a software programmer, an administrator, another presenter, or some other user) may input permissible or impermissible interactions using any of the above methods.

In some embodiments, to determine whether an interaction is a permissible interaction for the shared application, permission determination subsystem 114 may train a machine learning model to predict which interactions, of all possible interactions with a shared application, are permissible. For example, communication subsystem 112 may receive a training dataset including entries for applications and interactions. For example, communication subsystem 112 may receive the training dataset from data node 104. For example, the interactions may be interactions with portions of the applications. Each entry may include an output label indicating whether each interaction is permissible. Machine learning subsystem 116 may train, using the training dataset, a machine learning model to generate outputs that indicate whether interactions with portions of applications are permissible.

FIG. 3 illustrates a data structure 300 that may store training data for training a machine learning model, in accordance with one or more embodiments. For example, data structure 300 may represent a training dataset for a first plurality of applications. Data structure 300 may include entries for the first plurality of applications. Applications 303 may correspond to the first plurality of applications. Each entry may also include portions 306 and interactions 309. For example, portions 306 may be visual portions of applications 303. Portions 306 may include text, icons, shapes, images, videos, colors, or other visual portions of applications 303. In some embodiments, interactions 309 may include any possible interactions with portions 306 of applications 303. For example, interactions 309 may include clicking, scrolling, zooming, highlighting, dragging, dropping, and other interactions. A given interaction of interactions 309 may be included with multiple portions 306 within data structure 300. For example, <interaction_1> may be zooming in. As zooming in may be possible on multiple portions of an application, <interaction_1> is included with <portion_1a> and <portion_1c> of the first application. In some embodiments, <interaction_1> may also be included with portions of other applications, such as <portion_2a> and <portion_2c> of the second application. In some embodiments, data structure 300 may also include output labels 312 for each training identifier. For example, the output labels 312 may indicate whether a given interaction with a given portion of a given application is permissible for a participant to perform. For example, output labels 312 may be binary (permissible or impermissible), probabilities (0% to 100% chance of permissibility), or some other form of label.

Returning to FIG. 1, communication subsystem 112 may receive the training data (e.g., data structure 300) from data node 104 or from another computing device. In some embodiments communication subsystem 112 may receive the training data from one or more client devices 108*a*-108*n*. Each client device may include a computing device enabling transmission of the data. However, in some embodiments, the client devices may connect wirelessly to interactive sharing system 102. Communication subsystem 112 may pass the training data, or a pointer to the training data in memory, to machine learning subsystem 116.

Interactive sharing system 102 (e.g., machine learning subsystem 116) may train a machine learning model using a training dataset, such as data structure 300. For example, machine learning subsystem 116 may train a machine learning model to generate outputs that indicate whether a given interaction with a given portion of a given application is permissible for a participant to perform. The machine learning model may therefore be trained using data from a first plurality of applications to predict permissibility for a second plurality of applications. In some embodiments, the machine learning model may update predictions over time based on changes in association or access information associated with users.

In some embodiments, machine learning subsystem 116 uses a natural language processing model (or optical character recognition) that parses text strings in visual portions of a shared application. The use of the natural language processing model allows the system to analyze text strings within visual portions of the shared application. Text strings within shared applications may indicate meaningful differences between visual portions of the shared application. For example, a text string of "search" may indicate that a corresponding visual portion of the shared application includes a search bar and search button. In some embodiments, a text string of "authorized access only" may indicate that a corresponding visual portion of the shared application requires authorized login credentials to access. Beyond simply identifying text strings, the use of a natural language processing algorithm allows interpretation of the text strings for context, similarities, and connections. Based on the contexts and similarities, the natural language processing model may determine information about the visual portions. This process may allow machine learning subsystem 116 to generate or supplement training data or machine learning model inputs based on text strings identified in shared applications.

In some embodiments, machine learning subsystem 116 may categorize the text strings. For example, based on the identified contexts and similarities, the natural language processing model may create common descriptions or ontologies to describe disparities even across non-homogenous environments. These common descriptions or ontologies may allow machine learning subsystem 116 to refer to and cross-reference descriptions of user access and associations (e.g., in a centralized database) in a normalized manner. In some embodiments, categories may include categorization by application, by visual portion, by associated functionality, or according to other criteria. The natural language processing model may output the category information and machine learning subsystem 116 may include the category information with the training access information.

Machine learning subsystem 116 may include software components, hardware components, or a combination of both. For example, machine learning subsystem 116 may include software components (e.g., API calls) that access one or more machine learning models. Machine learning subsystem 116 may access training data, for example, in memory. In some embodiments, machine learning subsystem 116 may access the training data on data node 104 or on user devices 108a-108n. In some embodiments, the training data may include applications, visual portions of the applications, interactions with the visual portions, and corresponding output labels for the applications. In some embodiments, machine learning subsystem 116 may access one or more machine learning models. For example, machine learning subsystem 116 may access the machine learning models on data node 104 or on client devices 108a-108n. In some embodiments, the machine learning models may be trained to predict permissibility of interactions with various visual portions of shared applications.

Figure 4:
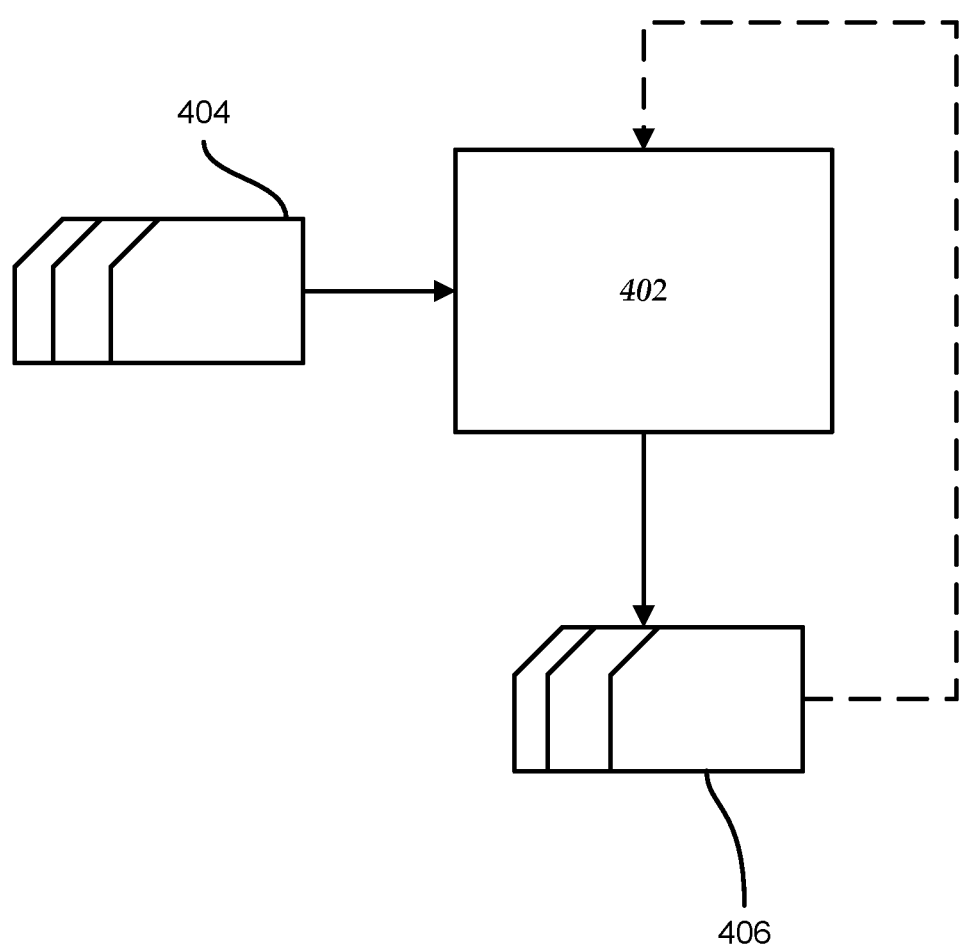
FIG. 4 illustrates an exemplary machine learning model, in accordance with one or more embodiments.

FIG. 4 illustrates an exemplary machine learning model 402, in accordance with one or more embodiments. The machine learning model may have been trained using applications, visual portions of those applications, interactions with those visual portions, and output labels (e.g., permissibility predictions) to predict whether interactions with the visual portions of the shared applications are permissible. In some embodiments, machine learning model 402 may be included in machine learning subsystem 116 or may be associated with machine learning subsystem 116. Machine learning model 402 may take input 404 (e.g., applications, portions, and interactions, as described in greater detail with respect to FIG. 5) and may generate outputs 406 (e.g., permissibility predictions, as described in greater detail with respect to FIG. 5). The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, to determine whether interactions with a shared application are permissible, permission determination subsystem 114 may utilize a machine learning model that is already trained to predict permissible interactions. For example, machine learning subsystem 116 may retrieve a machine learning model that is already trained to predict permissibility of interactions. Machine learning subsystem 116 may generate a dataset including, for the shared application, entries including possible interactions with visual portions of a shared application. Machine learning subsystem 116 may input, into a trained machine learning model, the dataset to obtain predictions indicating one or more permissible interactions for the shared application. Permission determination subsystem 114 may compare the interaction with the plurality of predictions output from the machine learning model. For example, permission determination subsystem 114 may determine whether the interaction with the particular visual portion of the shared application is included in the interactions that are predicted to be permissible. In some embodiments, machine learning subsystem 116 may input a dataset, including only the particular interaction of interest. For example, machine learning subsystem 116 may input the interaction, visual portion, and application into the trained machine learning model to obtain a prediction of whether the interaction is permissible.

FIG. 5 illustrates a data structure 500 for input into a machine learning model, in accordance with one or more embodiments. Data structure 500 may include one or more applications 503. Applications 503 may correspond to one or more shared applications. Each entry may also include portions 506 and interactions 509 with the portions. For example, portions 506 may be visual portions of applications 505. Portions 506 may include text, icons, shapes, images, videos, colors, or other visual portions of applications 505. In some embodiments, interactions 509 may include any possible interactions with portions 506 of applications 505. For example, interactions 509 may include clicking, scrolling, zooming, highlighting, dragging, dropping, and other interactions. In some embodiments, a given interaction of interactions 509 may be included with multiple portions 506 within data structure 500. In some embodiments, data structure 500 may be a subset of a larger data structure, including a larger number of interactions.

Machine learning subsystem 116 may input the dataset (e.g., data structure 500) into a machine learning model (e.g., machine learning model 402, as shown in FIG. 4). The machine learning model may be trained to predict permissibility of interactions, as discussed above in relation to FIG. 4. In some embodiments, machine learning subsystem 116 may obtain a plurality of predictions indicating whether each interaction is permissible. In some embodiments, the predictions may be output as binary outputs (access required or no access required), probabilities (0% to 100% chance of permissibility), or some other form of label.

FIG. 5 further illustrates a data structure 550 representing permissibility predictions, in accordance with one or more embodiments. Data structure 550 may include a permissibility prediction for each interaction with each visual portion of applications 503. For example, permissibility prediction 512 may indicate a predicted permissibility for interaction 1 with portion A of the shared application, permissibility prediction 515 may indicate a predicted permissibility for interaction 3 with portion A of the shared application, permissibility prediction 518 may indicate a predicted permissibility for interaction 4 with portion B of the shared application, permissibility prediction 521 may indicate a predicted permissibility for interaction 1 with portion C of the shared application, and permissibility prediction 524 may indicate a predicted permissibility for interaction 4 with portion C of the shared application. In some embodiments, data structure 550 illustrates predictions that are output in binary form (i.e., yes or no). As shown in FIG. 5, permissibility prediction 512 is yes, permissibility prediction 515 is no, permissibility prediction 518 is no, permissibility prediction 521 is yes, and permissibility prediction 524 is yes.

In some embodiments, data structure may illustrate predictions that are output in the form of a probability. For example, the probabilities may indicate a number between 0% and 100% chance of permissibility. A prediction of 0% may indicate that an interaction is impermissible while a prediction of 100% may indicate that an interaction is permissible. Any prediction between 0% and 100% indicates some level of uncertainty. In some embodiments, permission determination subsystem 114 may retrieve or determine a threshold for the probabilities output by the machine learning model. For example, permission determination subsystem 114 may receive a threshold of 50%, such that any predictions below 50% are determined to mean that the corresponding interaction is impermissible while any predictions meeting or exceeding 50% are determined to mean that the corresponding interaction is permissible. In some embodiments, data structure 550 may be a subset of a larger data structure including predictions for a larger number of interactions.

Returning to FIG. 1, in response to determining that the interaction is permissible, communication subsystem 112 may perform, according to the interaction, an action on the visual portion of the shared application on the first client device (e.g., participant view 212, as shown in FIG. 2B). An action corresponding to a clicking interaction may open a pop-up, load a new webpage, launch another application, or perform another action corresponding to the click on the first client device. An action corresponding to an adjustment of the view of the shared application may be adjusting the view, on the first client device, of the shared application based on the interaction. In some embodiments, communication subsystem 112 may transmit the adjusted view to the second client device. In some embodiments, the action is not performed on a corresponding visual portion of the shared application on the second client device (e.g., presenter view 210, as shown in FIG. 2A). In some embodiments, the action is not performed on a corresponding visual portion of the shared application on other client devices of client devices 108a-108n participating in the audio-visual communication session.

In response to permission determination subsystem 114 determining, based on authentication information associated with the shared application on the first client device, that the interaction is not permissible, communication subsystem 112 may decline to perform the action on the visual portion of the shared application on the first client device. Communication subsystem 112 may output, via the communication application on the first client device, a message indicating a reason for impermissibility of the interaction. For example, reasons may include that a user of the first client device lacks required authentication credentials, that a user of the second client device disabled the particular interaction, or that the interaction is impermissible for some other reason. In some embodiments, the system may output a message indicating permissible interactions for the shared application.

In response to performing the action, communication subsystem 112 may generate for display an indication of a view, on the second client device, of the shared application. The action may cause a new view of the shared application to be displayed on the first client device. The indication may be interactive such that a user of the first client device is enabled to select the indication to cause the view of the shared application to be displayed on the first client device. For example, performing the action may cause the view on the first client device (e.g., participant view 212, as shown in FIG. 2B) to differ from the view on the second client device (e.g., presenter view 210, as shown in FIG. 2A). Communication subsystem 112 may thus generate an indication of the view on the second client device (e.g., presenter view 210) for display on the first client device. The indication may be layered beneath the view on the first client device (e.g., participant view 212), as shown in display 275 of FIG. 2B. In some embodiments, the indication may be a button that the user of the first device can interact with to return to the view on the second client device (e.g., presenter view 210). In some embodiments, the indication may be in some other form.

In some embodiments, once permission determination subsystem 114 determines permissible interactions with a shared application, communication subsystem 112 may visually indicate the portions with which a user may perform permissible interactions via the shared application, for example, on the first client device. For example, communication subsystem 112 may cause visual portions of the shared application to appear different based on whether a user may perform permissible interactions with those portions. In some embodiments, communication subsystem 112 may cause a visual portion to appear highlighted, brighter, outlined, or otherwise emphasized if a user may interact with that portion. In some embodiments, communication subsystem 112 may cause a visual portion to appear dimmer, darker, grayed out, or otherwise deemphasized if a user may not interact with that portion. In another example, communication subsystem 112 may cause a cursor of the first client device to be altered when hovering over a portion with which the user may or may not interact (e.g., shaking, enlarging, shrinking, changing color or shape, or otherwise changing to indicate whether the user may interact with that portion).

In some embodiments, a user of a second client device (e.g., presenter 208, as shown in FIGS. 2A and 2B) may attempt to share an application which is partially or completely restricted to certain authorized users. In this example, for any portion of the shared application that is restricted, communication subsystem 112 may require, via the communication application or via the shared application, that each participant (e.g., the user of the first client device) enter unique login credentials to continue to interact with the shared application within the restricted portions. In some embodiments, communication subsystem 112 may prompt a user of the second client device to grant access to one or more of the participants or to share login credentials with one or more of the participants. In some embodiments, the user of the second client device may adjust settings relating to granting access or login credentials to users of other client devices participating in the audio-visual communication session (e.g., the first client device).

In the above example, if one or more participants (e.g., the user of the first client device) fails to enter valid login credentials or fails to be otherwise authorized to access the restricted portions of the shared application, permission determination subsystem 114 may limit the permissible interactions with the restricted portions of the shared application. For example, permission determination subsystem 114 may limit the permissible interactions to scrolling or zooming or may remove all permissible interactions such that the first client device and other client devices participating in the audio-visual communication session may view only the view of the shared application on the second client device (e.g., presenter view 210, as shown in FIG. 2A).

Communication subsystem 112 may receive inputs of security-related settings before or during the audio-visual communication session. For example, when the user of the second client device minimizes, obscures, or moves a window displaying the shared application, various settings may specify whether the shared application continues to run on the other client devices, such as the first client device. The settings may include time thresholds (e.g., the shared application ceases to run on the other client devices after one minute of being obscured), agreements between users, functionality to discontinue the shared application on a given client device, or limitations on permissible interactions with the shared application while it is minimized, obscured, or moved to a different window.

Communication subsystem 112 may receive inputs of limitations on a number or series of permissible interactions. For example, though the user of the first client device may be permitted to select various visual portions of a shared application, including hyperlinks, the user of the first client device may limit the number of selections the user of the second client device may make on the shared application. For example, the user of the second client device may wish to prevent the user of the first client device from straying too far from the content being shared during the audio-visual communication session. In some embodiments, the user of the second client device may specify that users of other client devices (e.g., participants) may make up to a maximum number of selections, scroll a maximum distance or number of pages, or make other limited interactions. In some embodiments, the user of the second client device may specify that users of other client devices are permitted to select hyperlinks that do not change a domain name of the shared application. In some embodiments, the user of the second client device may specify that users of other client devices are permitted to select hyperlinks that change a query string at the end of a path but do not change the path itself. In some embodiments, the user of the second client device or another user may specify additional limitations on the types, number, or series of permissible interactions that users may perform with the shared application. Settings may be input through a communication application, a shared application, or another application. Settings may be input by the system, by a user of the second client device, or by another user. Settings may be input before or during an audio-visual communication session and may be adjusted throughout the audio-visual communication session.

Computing Environment

Figure 6:
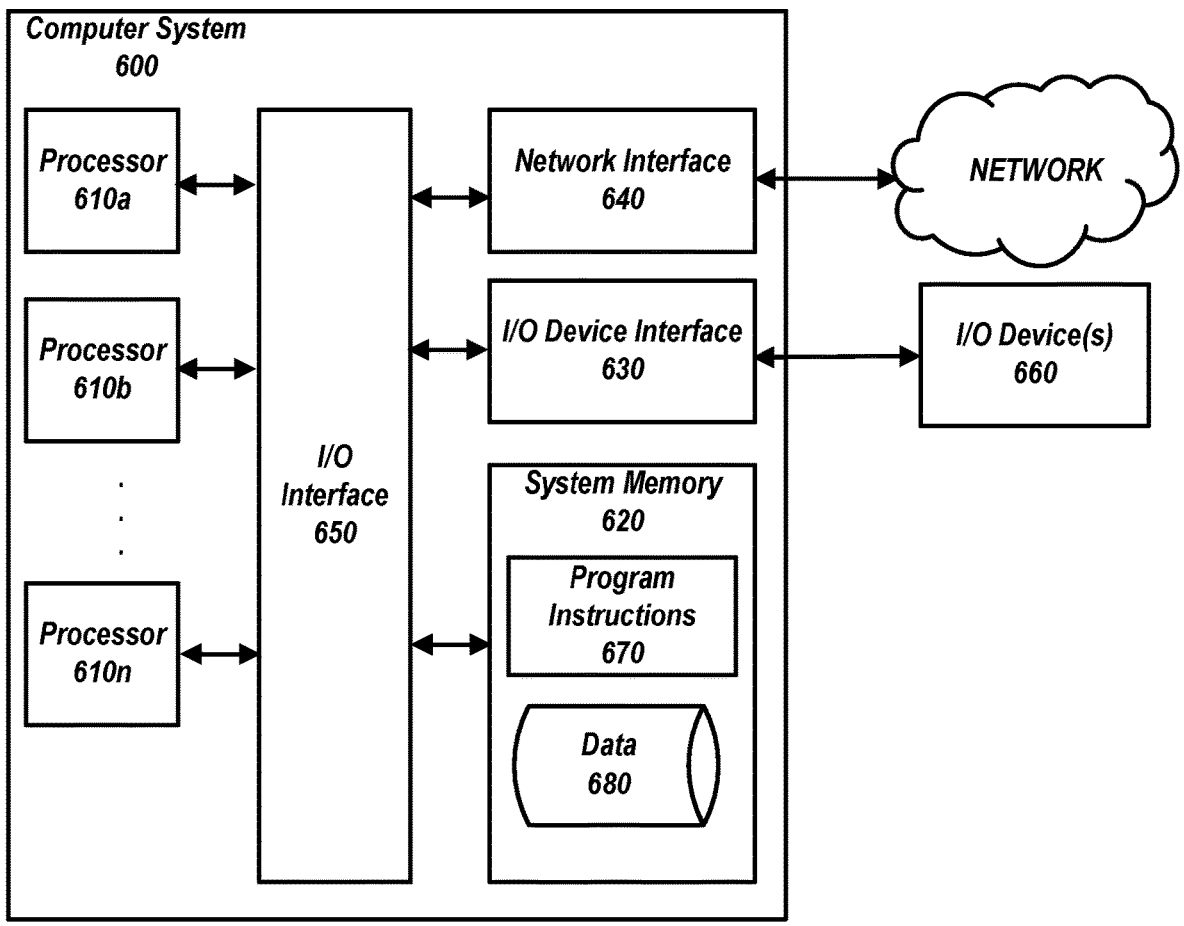
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
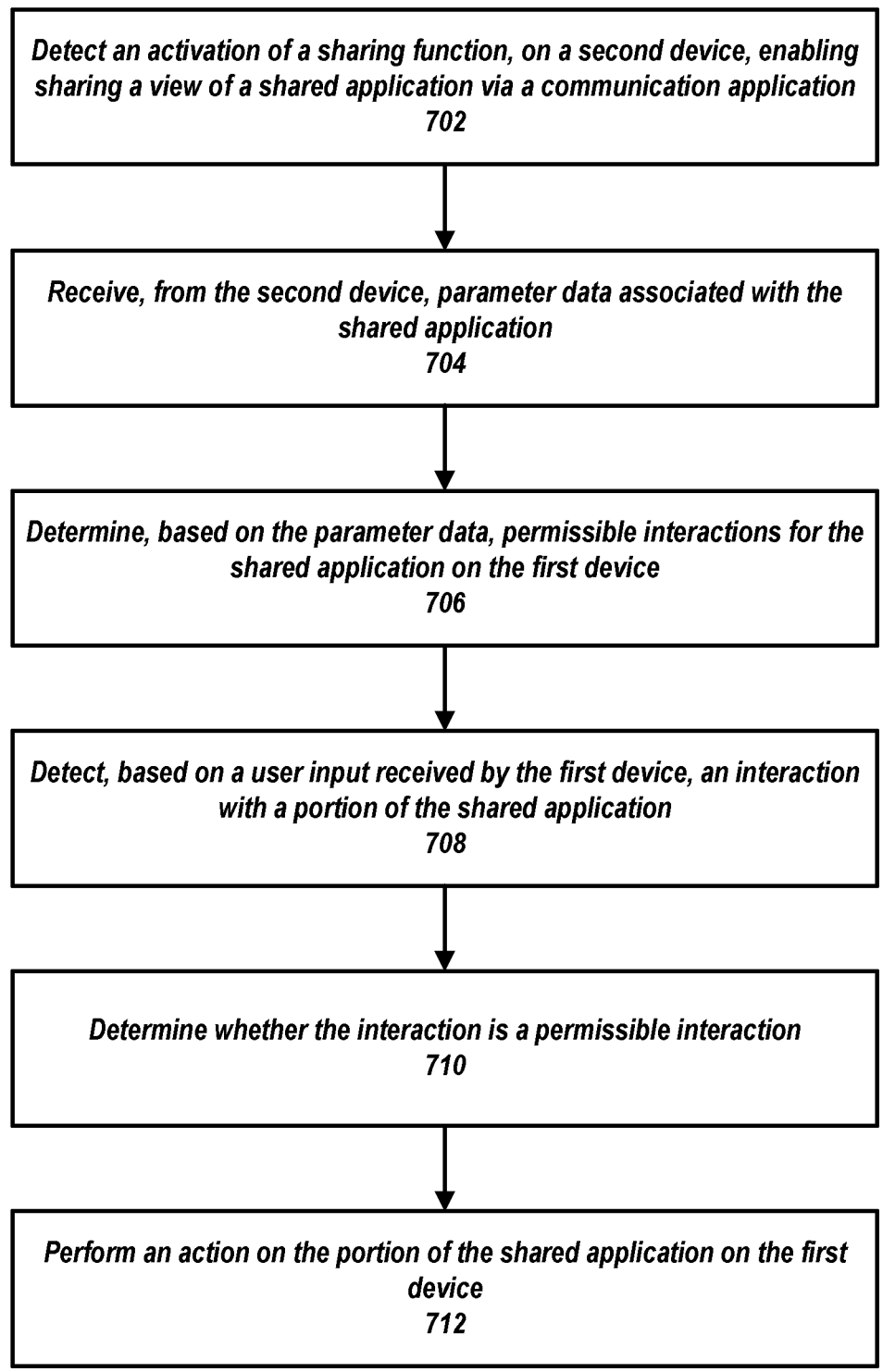
FIG. 7 shows a flowchart of the process for enabling permissible interactions with applications shared during audio-visual communication sessions, in accordance with one or more embodiments.

FIG. 7 shows a flowchart of the process 700 for enabling permissible interactions with applications shared during audio-visual communication sessions, in accordance with one or more embodiments. For example, the system may use process 700 (e.g., as implemented on one or more system components described above) to predict permissible interactions for a device to perform with portions of a shred application.

At step 702, process 700 (e.g., using one or more of processors 610a-610n) detects an activation of a sharing function, on a second device, enabling sharing a view of a shared application via a communication application. The sharing function may be activated by the communication application on a first device during an audio-visual communication session between a plurality of users. In some embodiments, process 700 may detect the activation of the sharing function via network interface 640.

At step 704, process 700 (e.g., using one or more of processors 610a-610n) receives, from the second device, parameter data associated with the shared application. For example, the parameter data may include a type of the shared application and activation instructions for activating the shared application on the first client device. In some embodiments, the activation instructions include an identifier of a file to access with the shared application. In some embodiments, process 700 may receive the parameter data from system memory 620, via the network, or elsewhere.

At step 706, process 700 (e.g., using one or more of processors 610a-610n) determines permissible interactions for the shared application on the first device. For example, process 700 may determine the permissible interactions based on the parameter data. The permissible interactions may be interactions that are permissible for the first device to perform with one or more portions of the shared application. At step 708, process 700 (e.g., using one or more of processors 610a-610n) detects an interaction with a portion of the shared application. Process 700 may detect the interaction based on a user input received by the first device. The interaction may include a selection of or an adjustment to a portion of the one or more portions of the shared application. In some embodiments, process 700 may detect the interaction via I/O device interface 630, network interface 640, or I/O device 660.

At step 710, process 700 (e.g., using one or more of processors 610a-610n) determines whether the interaction is a permissible interaction. For example, process 700 may determine whether the interaction is one of the permissible interactions determined at step 706. At step 712, process 700 (e.g., using one or more of processors 610a-610n) performs an action on the portion of the shared application on the first device. For example, process 700 may perform the action according to the interaction. In some embodiments, process 700 may not perform the action on a corresponding portion of the shared application on the second device. In some embodiments, process 700 may perform the action via I/O device interface 630, network interface 640, or I/O device 660.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising detecting, by a communication application on a first device during a communication session between a plurality of users, an activation of a sharing function on a second device, the sharing function enabling sharing a view of a shared application via the communication application, receiving, from the second device, parameter data associated with the shared application, determining, based on the parameter data, one or more permissible interactions for the first device to perform with one or more portions of the shared application, detecting, based on a user input received by the first device, an interaction with a portion of the shared application, determining whether the interaction is a permissible interaction of the one or more permissible interactions for the shared application, and in response to determining that the interaction is permissible, performing, according to the interaction, an action on the portion of the shared application on the first device.

2. The method of any one of the preceding embodiments, wherein the parameter data comprises a type of the shared application and activation instructions for activating the shared application on the first device, and wherein the activation instructions comprise an identifier of a file to access with the shared application.

3. The method of any one of the preceding embodiments, further comprising detecting the action by the communication application on the first device, determining, that the action is to be performed only on the first device, and refraining to send the action to the second device.

4. The method of any one of the preceding embodiments, further comprising determining that the interaction is an adjustment of the view of the shared application, adjusting the view, on the first device, of the shared application based on the interaction, and transmitting the view to the second device.

5. The method of any one of the preceding embodiments, wherein determining whether the interaction is the permissible interaction of the one or more permissible interactions for the shared application further comprises receiving a training dataset comprising a first plurality of entries for a first plurality of applications and a plurality of interactions, wherein the plurality of interactions is interacting with a first plurality of portions of the first plurality of applications, and wherein each entry comprises an output label indicating whether each interaction of the plurality of interactions with the first plurality of portions is permissible, and training, using the training dataset, a machine learning model to generate outputs that indicate whether interactions with portions of applications are permissible.

6. The method of any one of the preceding embodiments, wherein determining whether the interaction is the permissible interaction of the one or more permissible interactions for the shared application further comprises retrieving, from the first device, a plurality of possible interactions with a plurality of portions of the shared application, generating a dataset comprising, for the shared application, a plurality of entries comprising the plurality of possible interactions with the plurality of portions of the shared application, inputting, into a machine learning model, the dataset to obtain a plurality of predictions indicating the one or more permissible interactions for the shared application, wherein the machine learning model has been trained to indicate whether interactions with portions of applications are permissible, and comparing the interaction with the plurality of predictions.

7. The method of any one of the preceding embodiments, further comprising in response to determining, based on authentication information associated with the shared application on the first device, that the interaction is not permissible, declining to perform the action on the portion of the shared application on the first device, and outputting, via the communication application on the first device, a message indicating a reason for impermissibility of the interaction.

8. The method of any one of the preceding embodiments, further comprising, in response to performing the action, generating for display an indication of a view, on the second device, of the shared application, wherein the action causes a new view of the shared application to be displayed on the first device, and wherein the indication is interactive such that a user of the first device is enabled to select the indication to cause the view of the shared application to be displayed on the first device.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for enabling permissible interactions with applications shared during audio-visual communication session, the system comprising:
one or more processors; and
one or more non-transitory, computer-readable media comprising instructions that, when executed by the one or more processors, cause operations comprising:
detecting, by a communication application on a first client device during a communication session between a plurality of users, an activation of a sharing function on a second client device, the sharing function enabling sharing a view of a shared application via the communication application;
receiving, from the second client device, parameter data associated with the shared application, the parameter data comprising a type of the shared application and activation instructions for activating the shared application on the first client device, wherein the activation instructions comprise an identifier of a file to access with the shared application;
determining, based on the type of the shared application, one or more permissible interactions for the shared application;
upon activation of the shared application according to the activation instructions, detecting, based on a user input received by the first client device, an interaction with the shared application;
generating a dataset comprising, for the shared application, a plurality of entries comprising a plurality of possible interactions with a plurality of portions of the shared application;
inputting, into a machine learning model, the dataset to obtain a plurality of predictions indicating the one or more permissible interactions for the shared application, wherein the machine learning model has been trained to indicate whether interactions with portions of applications are permissible;
determining that the interaction is a permissible interaction of the one or more permissible interactions for the shared application; and
performing, based on determining that the interaction is permissible and according to the interaction, an action on a portion of the plurality of portions of the shared application.

2. The system of claim 1, wherein the plurality of portions of the shared application are a plurality of visual portions of the shared application.

3. The system of claim 1, wherein the instructions further cause the one or more processors to perform operations comprising:
determining, based on authentication information associated with the shared application on the first client device, that a different interaction is not permissible;
declining, based on determining that the different interaction is not permissible, to perform a different action on the first client device; and
outputting, via the communication application on the first client device, a message indicating a reason for impermissibility of the different interaction.

4. The system of claim 1, wherein the instructions further cause the one or more processors to perform operations comprising:
determining that the interaction is an adjustment of the view of the shared application;
adjusting the view, on the first client device, of the shared application based on the interaction; and
transmitting the view to the second client device.

5. A method comprising:
detecting, by a communication application on a first device during a communication session between a plurality of users, an activation of a sharing function on a second device, the sharing function enabling sharing a view of a shared application via the communication application;
receiving, from the second device, parameter data associated with the shared application;
determining, based on the parameter data, one or more permissible interactions for the shared application on the first device to perform with one or more portions of the shared application;
detecting, based on a user input received by the first device, an interaction with a portion of the shared application;
receiving or generating a dataset comprising a plurality of entries for a plurality of interactions;
inputting, into a machine learning model, the dataset to obtain a plurality of predictions indicating the one or more permissible interactions for the shared application, wherein the machine learning model has been trained to indicate whether interactions with portions of applications are permissible;

determining that the interaction is a permissible interaction of the one or more permissible interactions for the shared application; and performing, based on determining that the interaction is permissible, an action on the portion of the shared application on the first device.

6. The method of claim 5, wherein the parameter data comprises a type of the shared application and activation instructions for activating the shared application on the first device, and wherein the activation instructions comprise an identifier of a file to access with the shared application.

7. The method of claim 5, further comprising:
detecting the action by the communication application on the first device; and
determining that the action is to be performed only on the first device.

8. The method of claim 5, further comprising:
determining that the interaction is an adjustment of the view of the shared application;
adjusting the view, on the first device, of the shared application based on the interaction; and
transmitting the view to the second device.

9. The method of claim 5, wherein receiving or generating the dataset comprises:
receiving the dataset, wherein the plurality of interactions is interacting with a plurality of portions of a plurality of applications, and wherein each entry comprises an output label indicating whether each interaction of the plurality of interactions with the plurality of portions is permissible, and
wherein determining that the interaction is the permissible interaction comprises:
training, using the dataset, the machine learning model to generate outputs that indicate which of the plurality of interactions are permissible.

10. The method of claim 5,
wherein receiving or generating the dataset comprises:
retrieving, from the first device, information identifying the plurality of interactions, wherein the plurality of interactions are with a plurality of portions of the shared application;
generating the dataset based on the information regarding the plurality of interactions.

11. The method of claim 5, further comprising:
determining, based on authentication information associated with the shared application on the first device, that a different interaction is not permissible;
declining, based on determining that the different interaction is not permissible, to perform a different action; and
outputting, via the communication application on the first device, a message indicating a reason for impermissibility of the different interaction.

12. The method of claim 5, further comprising:
generating, based on performing the action, an indication of a view of the shared application, wherein the indication is configured to be selected to cause the view of the shared application to be displayed on the first device.

13. A non-transitory, computer-readable medium storing instructions that when executed by one or more processors cause the one or more processors to perform operations comprising:
detecting, by a communication application on a first device during a communication session between a plurality of users, an activation of a sharing function on a second device, the sharing function enabling sharing a view of a shared application via the communication application;
receiving, from the second device, parameter data associated with the shared application;
determining, based on the parameter data, one or more permissible interactions for the shared application on the first device to perform with one or more portions of the shared application;
detecting, based on a user input received by the first device, an interaction with a portion of the shared application;
receiving or generating a dataset comprising a plurality of entries for a plurality of interactions;
inputting, into a machine learning model, the dataset to obtain a plurality of predictions indicating the one or more permissible interactions for the shared application, wherein the machine learning model has been trained to indicate whether interactions with portions of applications are permissible;
determining that the interaction is a permissible interaction of the one or more permissible interactions for the shared application; and
performing, based on determining that the interaction is permissible, an action on the portion of the shared application on the first device.

14. The non-transitory, computer-readable medium of claim 13, wherein the parameter data comprises a type of the shared application and activation instructions for activating the shared application on the first device, and wherein the activation instructions comprise an identifier of a file to access with the shared application.

15. The non-transitory, computer-readable medium of claim 13, wherein the instructions cause the one or more processors to perform operations comprising:
detecting the action by the communication application on the first device;
determining that the action is to be performed only on the first device; and
refraining to send the action to the second device.

16. The non-transitory, computer-readable medium of claim 13, wherein the instructions cause the one or more processors to perform operations comprising:
determining that the interaction is an adjustment of the view of the shared application;
adjusting the view, on the first device, of the shared application based on the interaction; and
transmitting the view to the second device.

17. The non-transitory, computer-readable medium of claim 13, wherein, to determine that the interaction is the permissible interaction, the instructions cause the one or more processors to perform operations comprising:
training, using the dataset, the machine learning model to generate outputs that indicate the one or more permissible interactions for the shared application.

18. The non-transitory, computer-readable medium of claim 13, wherein, to determine that the interaction is the permissible interaction, the instructions cause the one or more processors to perform operations comprising:
comparing the interaction with the plurality of predictions.

19. The non-transitory, computer-readable medium of claim 13, wherein the instructions cause the one or more processors to perform operations comprising:
determining, based on authentication information associated with the shared application on the first device, that a different interaction is not permissible;

declining, based on determining that the different interaction is not permissible, to perform a different action; and outputting, via the communication application on the first device, a message indicating a reason for impermissibility of the different interaction.

20. The non-transitory, computer-readable medium of claim 13, wherein the instructions cause the one or more processors to perform operations comprising:

generating, based on performing the action, an indication of a view of the shared application, wherein the indication is configured to be selected to cause the view of the shared application to be displayed on the first device.

* * * * *